996,512. CORN-CULTIVATOR. WARNER PARKHURST, Plainville, Kans. Filed June 22, 1910. Serial No. 568,355.

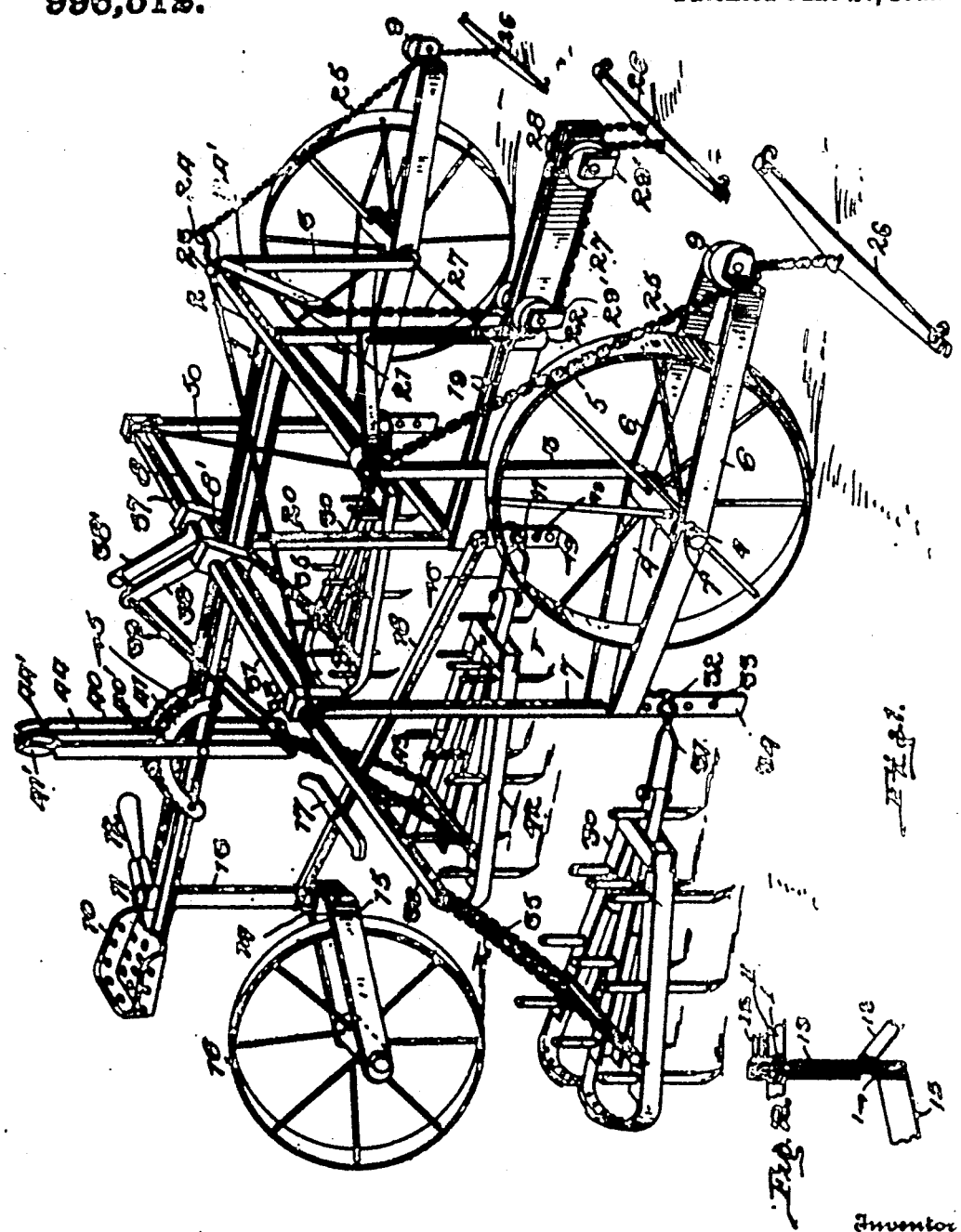

*To all whom it may concern:*

Be it known that I, WARNER PARKHURST, a citizen of the United States, residing at Plainville, in the county of Rooks and State of Kansas, have invented certain new and useful Improvements in Corn-Cultivators, of which the following is a specification, reference being had therein to the accompanying drawing.

This invention relates to cultivators, and has special reference to that class of cultivators in which a traveling vehicle is provided with a number of harrows and means for adjusting and guiding the harrows.

The invention has for its object to provide an improved cultivator of this kind which may be used interchangeably to cultivate corn and prepare the ground for wheat and to plant the same.

The invention further has for its object to provide an improved cultivator which may be used to harrow the corn ground when the corn is high, and by means of which the harrows may be removed and drills secured to the cultivator for sowing wheat.

With these and other objects in view, the invention consists in an improved cultivator and in details of construction thereof as hereinafter set forth and claimed.

Referring to the accompanying drawings: Figure 1 is a view in perspective of a cultivator constructed in accordance with this invention. Fig. 2 is an enlarged detail view partly in vertical section and broken away of the jointed portion of the connection of the steering wheel with the frame.

In carrying out the invention, the cultivator is formed with a frame, preferably consisting of a pair of longitudinal bars or rods 1 secured at their forward end to the horizontal portions 2 of a transverse metallic U-shaped frame having depending portions 3, with their lower ends bent laterally to form stub shafts 4, which extend through the hubs 4' of wheels 5 and through the parallel bars 6, said stubs 4 being secured by a cotter pin 7' and the inner ends of said bars 6 being integral with and projecting from the lower portion of each of the depending portions 7 of a metallic U-shaped frame 8, which is mounted on the longitudinal bars 1 by means of brackets 8' integral with said bars 1. Mounted in the forward end of each of the pairs of bars 6 is a grooved pulley 9 for a purpose hereinafter set forth. Mounted on the rear end of the longitudinal bars 1 is a driver's seat 10, in front of which is located the upper end of a rotary shaft 11 provided with a handle 12 in reach of the operator seated in the seat 10. The shaft 11 extends down through a sleeve 13, secured to and depending from one of the longitudinal bars 1, the lower end of said shaft 11 being mounted in a sleeve 14 located in one end of and secured to a rearwardly extending U-shaped strap member 15 in the rear ends of which is mounted a guide wheel 16.

17 indicates a foot rest for the driver's feet mounted on a rod 18, connected at one end to the sleeve 13 and at its other end to one of a pair of longitudinal bars 19 secured at their rear ends to the lower portion of a vertical rod 20, depending from the longitudinal rods 1. Bars 19 are supported intermediate of their ends by means of a vertical rod 21 secured at its lower end in a sleeve 22 of the rods 19, and at its upper end to the cross portion of the U-shaped frame 2. Pivoted to a sleeve 23 at each end of the horizontal portion of the U-shaped frame 2 is a lever arm having a short member 24 and a long member 24', the short member 24 being connected at one end by means of a chain 25, with a whiffle tree 26, said chain extending under and part way around the grooved pulley 9. The long member 24' of the pivoted lever is connected by means of a chain 27 with a whiffle tree 26, said chain 27 extending over grooved pulleys 28, mounted in brackets 29' on each of the bars 19.

On each of the outer sides of the cultivator is located a harrow 30, connected at its forward end by a wire link 31, engaging a pin 32, adapted to be adjustably mounted in one of the holes 33 of a depending portion 34 of the depending arm 7 of the U-shaped frame 8. The harrows 30 are raised and lowered by means of chains 35 connected at one end with the harrows and at the other end with downwardly inclined laterally projecting arms 36 of rotary shafts 37, each having its bearings in a block 38 on U-shaped frame 8, and in one of the brackets 8' on the longitudinal bars 1. Each of the rotary shafts 37 has at its inner end a lever arm 38' which is connected by a rod 39 to the lower end of a lever arm 40, pivoted to the longitudinal arms 1, and having a pawl 40' engaging a tooth segment 41 mounted on the longitudinal rods 1. The lever arms 40 each have a handle 41' within reach of the driver. Located centrally beneath the cultivator is a harrow 42 connected by means of chains 43 with the lower end of a lever 44 pivoted to the longitudinal bars 1, and having a pawl engaging a segmental rack bar 45', the upper end of the lever 44 having a handle 44' in reach of the driver. The harrow 42 is connected by a link 46 with an adjustable pin 47, engaging one of the holes 48 in the depending portion 49 of the depending rod 20.

It will be seen that by means of this construction and arrangement of parts, as hereinbefore described, the harrows will extend over and be adapted to operate upon a wide area of ground, and that they can be readily lowered to and raised out of position by means of the driver. It will also be seen that by means of the steering wheel 16 the driver can control and regulate any irregular movement in the passage of the cultivator over the ground, due to the irregular movements of the horses. Furthermore, it will be seen that by means of the chain connections of the whiffle trees with the pivoted levers on the frame, the irregular draft movement of the horses will be automatically regulated. The U-shaped frames 2 and 8 are braced by means of diagonal brace rods 50. When it is desired to use the cultivator for sowing wheat the harrows may be readily detached and drills be secured to the depending portions 34 and 49 of the arms 7 and 20.

By means of this improved cultivator the ground may be cultivated late in the season, so as to hold moisture and increase the yield of corn and put the ground in fine shape for wheat. By means of this invention a large number of acres of ground can be cultivated in one day by one man with three horses, and a great saving in time and labor and expense obtained.

Having described the invention, I claim:

A cultivator of the character described comprising a frame, said frame consisting of a pair of longitudinal bars, a U-shaped frame secured to the forward ends of said bars, said U-shaped frame comprising a transverse bar having at each end a depending rod bent at its lower end to provide a stub-axle, and a third depending rod intermediate the ends of said bar, a second U-shaped frame mounted on said longitudinal bars intermediate their ends and provided with depending rods at each end, and one intermediate its ends, a forwardly extending wheel-frame projecting from each of the end rods, said wheel frames engaging the stub-axles of the first-named U-shaped frame, guide rollers in the forward ends of said wheel frames, wheels mounted in the wheel frames, a pair of horizontal bars supported intermediate their ends by the central depending rod of the first-named U-shaped frame and secured at their rear ends to the central depending rod of said second mentioned U-shaped frame, said bars provided with guide rollers, harrows secured to the depending rods of the second mentioned U-shaped frame, adjusting means for said harrows carried by the last named frame, draft means carried by the first-named U-shaped frame and engaging said guide rollers and steering means for said frame.

In testimony whereof I hereunto affix my signature in presence of two witnesses.

WARNER PARKHURST.

Witnesses:
W. R. GREEN,
C. BUCHHEISTER.